United States Patent [19]
Dietrich et al.

[11] Patent Number: 5,401,943
[45] Date of Patent: Mar. 28, 1995

[54] METHOD AND APPARATUS FOR SHIPPING ELECTRONICALLY STORED COMMUNICATIONS DATA

[75] Inventors: Klaus Dietrich; Stephan Günther; Norbert Knoth; Friedrich-Viktor Miehe; Wolfgang Thiel, all of Berlin, Germany

[73] Assignee: Francotyp-Postalia GmbH, Berlin, Germany

[21] Appl. No.: 822,352

[22] Filed: Jan. 17, 1992

[30] Foreign Application Priority Data

Jan. 17, 1991 [DE] Germany ............ 41 01 444.8

[51] Int. Cl.⁶ ................................ G06F 15/20
[52] U.S. Cl. ............................ 235/375; 235/432; 364/464.02
[58] Field of Search .................. 235/375, 432; 364/464.02, 464.03; 53/411, 131.4, 284.3

[56] References Cited

U.S. PATENT DOCUMENTS

| | | | |
|---|---|---|---|
| 4,644,731 | 2/1987 | Zangheri | 53/411 |
| 4,760,532 | 7/1988 | Sansone et al. | 235/375 X |

FOREIGN PATENT DOCUMENTS

| | | | |
|---|---|---|---|
| 0331352 | 9/1989 | European Pat. Off. | 364/464.02 |
| 3319919 | 12/1984 | Germany . | |
| 2184693 | 7/1987 | United Kingdom | 364/464.02 |

*Primary Examiner*—Davis L. Willis
*Assistant Examiner*—Edward Sikorski
*Attorney, Agent, or Firm*—Herbert L. Lerner; Laurence A. Greenberg

[57] ABSTRACT

A method for shipping electronically stored letter contents or communications and/or data on flat information carriers, particularly chip cards, requiring postal franking or prepaid postage, includes storing shipping data in at least one of a plurality of memory regions of the information carrier. The shipping data is read out with a read-write module. The shipping data is linked to a postage table being stored in memory, for calculating a postage value appropriate for shipment of the information carrier. An accounting or debit is made for the calculated postage value for the information carrier with a postage meter device. A postage imprint is printed on an item to be shipped. In an apparatus for carrying out the invention, the read-write module and the postage meter device are integrated into a unit.

10 Claims, 1 Drawing Sheet

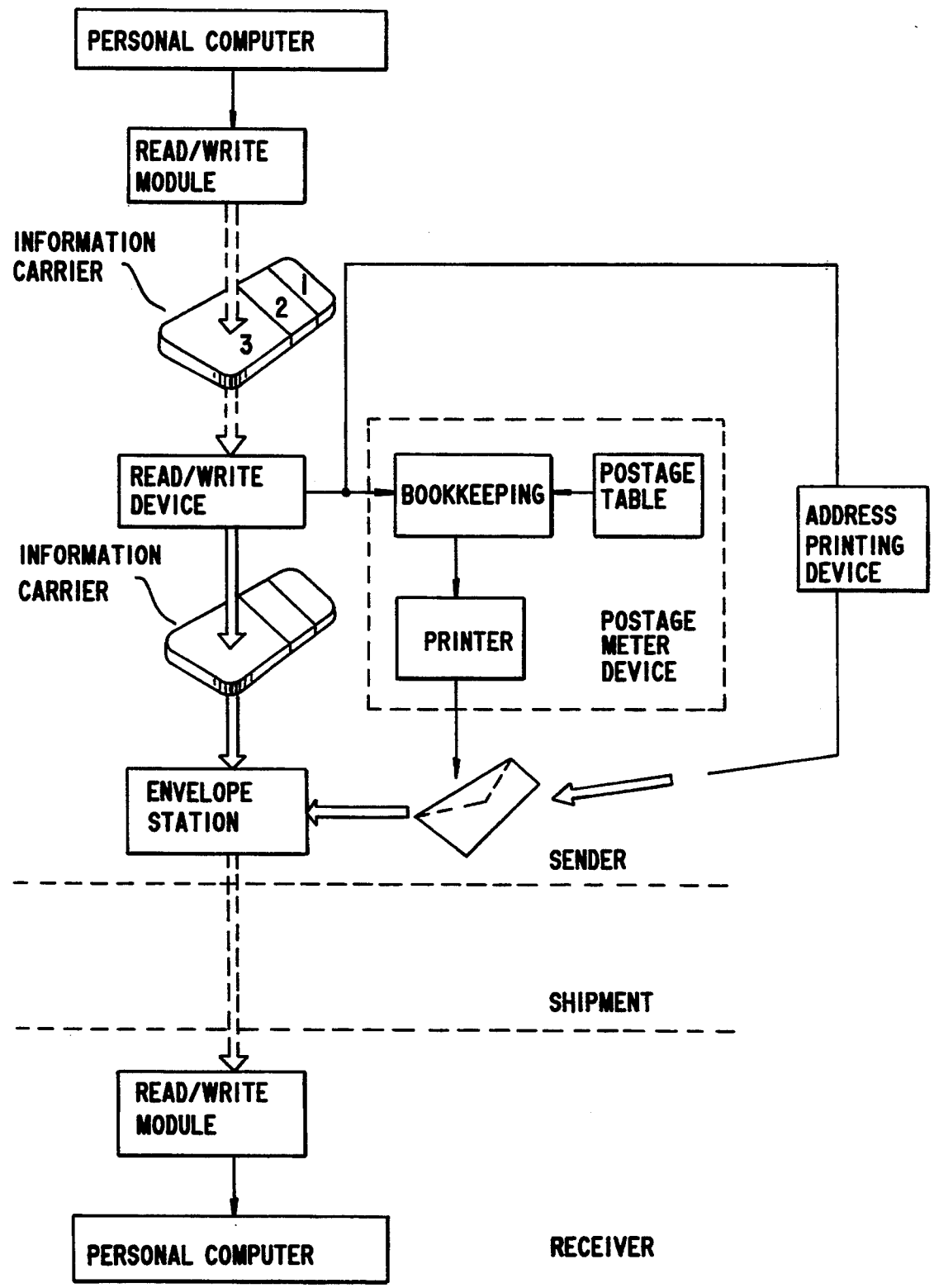

METHOD AND APPARATUS FOR SHIPPING ELECTRONICALLY STORED COMMUNICATIONS DATA

BACKGROUND OF THE INVENTION

1. Field of the Invention

The invention relates to a method and an apparatus for sending or shipping electrically stored communications or letter contents and/or data on flat information carriers, such as chip cards, that require prepaid postage.

Electronically stored and optionally additionally encoded letter contents or communications which are, for instance, output to a chip card by a personal computer, through a read-write device connected thereto, and are stored in memory in the chip card, may be shipped in the conventional manner in an envelope. The sending of chip cards can be done to transmit information or for the one-time delivery of the chip card to persons in order to make the cards available to them. Depending on the way that mass mailings are to be sent and shipped and on the address, such mailings require the application of different postage values, which would conventionally have to be entered into a postage meter machine by operators.

SUMMARY OF THE INVENTION

It is accordingly an object of the invention to provide a method and an apparatus for sending electronically stored communications data, which overcome the hereinafore-mentioned disadvantages of the heretofore-known methods and devices of this general type and which enable automatic franking of items to be shipped containing electronically stored letter contents or communications.

With the foregoing and other objects in view there is provided, in accordance with the invention, a method for sending electronically stored letter contents or communications and/or data on flat information carriers, such as chip cards, requiring postal franking or prepaid postage, which comprises storing shipping data in at least one of a plurality of memory regions of an information carrier requiring postal franking; reading out the shipping data with a read-write module; linking the shipping data to a postage table being stored in memory, for calculating a postage value appropriate for shipment of the information carrier; accounting for or debiting the calculated postage value for the information carrier with a postage meter device; and printing a postage imprint on an item to be shipped.

These shipping data include the address of the receiver and may in addition include the shipment mode, such as air mail, express letter, and so forth, along with an advertising field.

In accordance with another mode of the invention, there is provided a method which comprises printing the postage imprint on an envelope with the postage meter device.

In accordance with a further mode of the invention, there is provided a method which comprises printing the postage imprint on a strip with the postage meter device.

In accordance with an added mode of the invention, there is provided a method which comprises printing the postage imprint on a part of a surface of the information carrier with the postage meter device.

In accordance with an additional mode of the invention, there is provided a method which comprises accessing the memory regions the information carrier with different access authorizations.

In accordance with yet another mode of the invention, there is provided a method which comprises reading out complete address data from the memory region of the information carrier and printing out the complete address data.

In accordance with yet a further mode of the invention, there is provided a method which comprises imprinting an address having alphanumeric characters with the postage meter device.

In accordance with yet an added mode of the invention, there is provided a method which comprises transmitting the address data to a special address printing device, and printing out the address data with the special address printing device.

With the objects of the invention in view, there is also provided an apparatus for carrying out the invention in which the read-write module and the postage meter device are integrated into a unit.

The advantage of the invention resides in automatic franking and shipping of carriers of electronically stored letter contents or communications.

Other features which are considered as characteristic for the invention are set forth in the appended claims.

Although the invention is illustrated and described herein as embodied in a method and an apparatus for sending electronically stored communications data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The drawing is a schematic circuit diagram including diagrammatic perspective views, which are used to illustrate the invention.

DESCRIPTION OF THE PREFERRED EMBODIMENTS

Referring now to the single FIGURE of the drawing in detail, it is seen that letter contents or communications that are produced, for instance, by a personal computer PCA of a sender, are transmitted to a flat information carrier IC, for instance a chip card, through a read-write module SL, which is connected to the PCA through a standard interface. Such information carriers are known, for instance, in the form of electronic notebooks, patient passes, or debit cards. The letter content or communication is stored in a memory region 3 of the information carrier IC. These letter contents or communications may include texts, excerpts from data banks, program files or other electronically storable information. Address data and optionally shipment mode information are stored in memory in a memory region 1. Graphic data regarding an advertising field to be printed are stored in a further memory region 2. The read-write module SL may be constructed as a separate unit, or it may be integrated in the personal computer PCA.

For shipping purposes, a read-write module LSA is supplied for the information carrier IC. This module takes the data that are relevant for shipping from the memory region 1 of the information carrier IC and transmits them to bookkeeping means BM. The bookkeeping means BM links the shipping data to a postage table PT that is stored in memory and calculates and debits or accounts for the postage charges. There is no need to include weight data in the postage calculation because the information carrier IC always has the same weight, regardless of the scope of information stored thereon. The charges that are thus calculated are transmitted, together with the data on the shipment mode and the advertising field, to a unit that is used for printing the postage imprint.

If the information carrier IC is shipped conventionally with a letter-type envelope, then a postage imprint is made on the envelope by means of a printer DW. A delivery, enveloping and closure station ZKS connected to the printer serves the purpose of further automatic processing.

According to another variant embodiment, the printer DW prints a postage strip that is adhesively applied to the information carrier IC. Another variant embodiment provides for direct printing of the postage data on part of the surface of the information carrier IC that is prepared for this purpose.

Functionally, the bookkeeping means BM, the postage table PT and the printer DW form a postage meter device FE. This postage meter device FE and the read-write device LSA may be constructed as separate units or integrated in a common housing.

According to a special variant embodiment, the address information that is read out for calculating the postage value is printed out in addition to the postage imprint. To this end, the postage meter device FE must be equipped with a printer that is suitable for printing an address. For instance, a thermal transfer printer having a printing width that encompasses both the postage imprint and the address imprint, can be used for this purpose. Alternatively, it is also possible to transmit the address data to a special address printer.

A shipping service, such as the postal service or a courier service, conveys the information carrier IC to the receiver or addressee. Through the use of a read-write module LSE coupled to a personal computer PCE, the information content from the information carrier IC is read out at the addressee and is available to the addressee through the personal computer PCE.

The invention makes use of the known characteristics of portable IC or chip cards with encryption, in order to handle transactions in which user authenticity with respect to the system is created, for instance by means of a private key or code word and a further public key, so that access to the system is thereby enabled, as disclosed in German Published, Non-Prosecuted Application DE 33 19 919 A1. In this way, access to the address data can be separated from access to the stored letter contents or communication.

We claim:

1. A method for shipping flat information carriers having electronic data stored thereon and requiring postal franking, which comprises:
   electronically storing shipping data in at least one of a plurality of memory regions of an information carrier having electronic data stored thereon and requiring postal franking;
   electronically reading out the shipping data with a read-write module;
   linking the shipping data to a postage table stored in memory of a postage meter device, for calculating a postage value appropriate for shipment of the information carrier;
   accounting for the calculated postage value for the information carrier with the postage meter device; and
   printing a postage imprint corresponding to the calculated postage value.

2. The method according to claim 1, which comprises printing the postage imprint on an envelope with the postage meter device and shipping the information carrier in the envelope.

3. The method according to claim 1, which comprises printing the postage imprint on a strip with the postage meter device.

4. The method according to claim 1, which comprises reading out complete address data from the memory region of the information carrier and printing out the complete address data on an item to be shipped.

5. The method according to claim 4, which comprises imprinting an address having alphanumeric characters with the postage meter device.

6. The method according to claim 4, which comprises transmitting the address data to a special address printing device, and printing out the address data with the special address printing device.

7. An apparatus for shipping electronically stored data, comprising:
   an information carrier having electronic data stored thereon and requiring postal franking, said information carrier having a plurality of memory regions including at least one memory region for storing shipping data;
   a read-write module communicating with said information carrier for reading out the shipping data;
   a postage meter device being integrated with said read-write module and having a memory;
   a postage table stored in said memory and communicating with said read-write module for receiving the shipping data and calculating a postage value appropriate for shipment of said information carrier;
   said postage meter device having means for accounting for the calculated postage value for said information carrier; and
   means communicating with said postage meter device for printing a postage imprint on an item to be shipped corresponding to the calculated postage value.

8. The apparatus according to claim 7, wherein said information carrier is a chip card.

9. An apparatus for shipping flat information carriers having electronic data stored thereon and requiring postal franking, comprising:
   a read-write module communicating with a flat information carrier having electronic data stored thereon and requiring postal franking for reading out shipping data stored in at least one of a plurality of memory regions of the information carrier;
   a postage meter device integrated with said read-write module for accounting for a calculated postage value for the information carrier;
   a postage table stored in a memory of said postage meter device and communicating with said read-write module for receiving the shipping data and calculating a postage value to be printed by said postage meter device appropriate for shipment of the information carrier; and means communicating with said postage meter device for printing a postage imprint corresponding to the calculated postage value.

10. The apparatus according to claim 9, wherein the information carrier is a chip card.

* * * * *